(12) United States Patent
Douceur et al.

(10) Patent No.: US 7,574,457 B2
(45) Date of Patent: Aug. 11, 2009

(54) NON-MUTATING TREE-STRUCTURED FILE IDENTIFIERS

(75) Inventors: John R. Douceur, Bellevue, WA (US); Jonathan R. Howell, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 167 days.

(21) Appl. No.: 11/275,550

(22) Filed: Jan. 13, 2006

(65) Prior Publication Data

US 2007/0168364 A1 Jul. 19, 2007

(51) Int. Cl.
*G06F 17/30* (2006.01)
*G06F 17/00* (2006.01)

(52) U.S. Cl. .................. 707/200; 707/10; 707/100; 707/104.1; 709/213; 709/214; 709/215; 709/216

(58) Field of Classification Search ............... 707/200, 707/104.1, 10, 100; 709/213, 214, 215, 216
See application file for complete search history.

(56) References Cited

U.S. PATENT DOCUMENTS

| | | | | |
|---|---|---|---|---|
| 5,287,414 | A * | 2/1994 | Foster | 382/100 |
| 6,249,782 | B1 * | 6/2001 | Day et al. | 707/2 |
| 6,351,758 | B1 * | 2/2002 | Courtney et al. | 708/404 |
| 7,293,039 | B1 * | 11/2007 | Deshmukh et al. | 707/102 |
| 2002/0188605 | A1 * | 12/2002 | Adya et al. | 707/4 |
| 2003/0110150 | A1 * | 6/2003 | O'Neil et al. | 707/1 |
| 2003/0189642 | A1 * | 10/2003 | Bean et al. | 348/207.1 |
| 2006/0059204 | A1 * | 3/2006 | Borthakur et al. | 707/200 |

OTHER PUBLICATIONS

Smith et al., "Primer for College Algebra", 1990, Brooks/Cole Publishing Co., p. 520.*
Adya, Atul et al., "FARSITE: Federated, Available, and Reliable Storage for an Incompletely Trusted Environment," 5th OSDI, Dec. 2002, 14 pages.
Castro, Miguel et al., "Practical Byzantine Fault Tolerance", 3rd OSDI, USENIX, Feb. 1999, 14 pages.
Douceur, John R. et al., "A Large-Scale Study of File-System Contents", SIGMETRICS, May 1999, 12 pages.
Elias, Peter, "Universal Codeword Sets and Representations of the Integers", IEEE Trans. Info. Theory 21(2), pp. 194-203, 1975.
Howard, J. et al., "Scale and Performance in a Distributed File System", TOCS 6(1). Feb. 1988, pp. 51-81.
Ousterhout, John K. et al., "The Sprite Network Operating System", IEEE Computer Group Magazine 21 (2), 1998, 32 pages.
Sidebotham, Bob, "Volumes: The Andrew File System Data Structuring Primitive", EUUG Conference Proceedings, pp. 473-480, 1986.
Welch, Brent et al., "Prefix Tables: A Simple Mechanism for Locating Files in a Distributed System", 6th ICDCS, pp. 184-189, 1986.

* cited by examiner

*Primary Examiner*—Tony Mahmoudi
*Assistant Examiner*—Nicholas F Woronko
(74) *Attorney, Agent, or Firm*—Lee & Hayes, PLLC

(57) ABSTRACT

Non-mutating tree-structured file identifiers are used to identify files stored in a file system. Each of multiple files in the file system has a corresponding non-mutating file identifier, and these file identifiers are assigned and maintained using a tree structure.

16 Claims, 12 Drawing Sheets

NON-MUTATING TREE-STRUCTURED FILE IDENTIFIERS

BACKGROUND

File systems manage files and other data objects stored on computer systems. File systems were originally built into a computer's operating system to facilitate access to files stored locally on resident storage media. As computers became networked, some file storage capabilities were offloaded from individual user machines to special storage servers that stored large numbers of files on behalf of the user machines. In this server-based architecture, the file system was extended to facilitate management of and access to files stored remotely at the storage server over a network. Today, file storage is migrating toward a model in which files are stored on various networked computers, rather than on a central storage server.

However, one problem that is encountered in storing files across multiple networked computers, whether it be multiple central storage servers or a serverless architecture, is how the computers reference the files. This problem is only exacerbated as the size of networks and the number of files stored on the networks increases.

For example, computers could reference files using only their file path names, which identify the files beginning with a root and listing each folder or directory in the path to where the file is stored. However, this is problematic because it can require changes to vast amounts of the file system when a file, directory, or folder is renamed or moved. The rename or move operation can cause many of the files and directories or folders that include the renamed or moved file, directory, or folder in their path to also be renamed. Thus, renaming a single file, directory or folder could result in tens of thousands of file path names being changed. Renaming a single file, directory or folder could also result in which ones of the servers are responsible for managing particular file path names being changed for tens of thousands of file path names. Restrictions on renaming or moving files, directories, and folders could be implemented so that renames requiring such large amounts of changes are not permitted, but such restrictions would reduce the user-friendliness of the file system because some rename or move operations would not be permitted.

By way of another example, computers could reference files using a tuple which includes a volume identifier and a file number. The volume identifier identifies which server manages the tuple, and the file number identifies the file on that server. One problem with using such tuples, however, is that a single volume cannot be split across multiple servers—all files having the same volume identifier are managed by the same server. Another problem with using such tuples is that files can be renamed only within the same volume—a file is not permitted to be renamed to have a different volume identifier. Thus, care must be taken in assigning files to volumes when using such tuples. Such restrictions on renaming files, as well as the additional care that must be taken in assigning files to volumes, reduces the user-friendliness of the file system.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with certain aspects of the non-mutating tree-structured file identifiers discussed herein, a file system stores multiple files and each file has a corresponding non-mutating file identifier. These non-mutating file identifiers are assigned and maintained using a tree structure.

In accordance with other aspects of the non-mutating tree-structured file identifiers discussed herein, the non-mutating file identifiers are made up of multiple components. An encoded file identifier is created by encoding each of these multiple components of a non-mutating file identifier, and concatenating the resulting encoded components.

BRIEF DESCRIPTION OF THE DRAWINGS

The same numbers are used throughout the document to reference like components and/or features.

DETAILED DESCRIPTION

The following discussion is directed to non-mutating tree-structured file identifiers. A file system partitions files and file identifiers across multiple networked computing devices. One or more of these computing devices operate as directory servers that are responsible for maintaining the non-mutating file identifiers using a tree structure.

Figure 1:
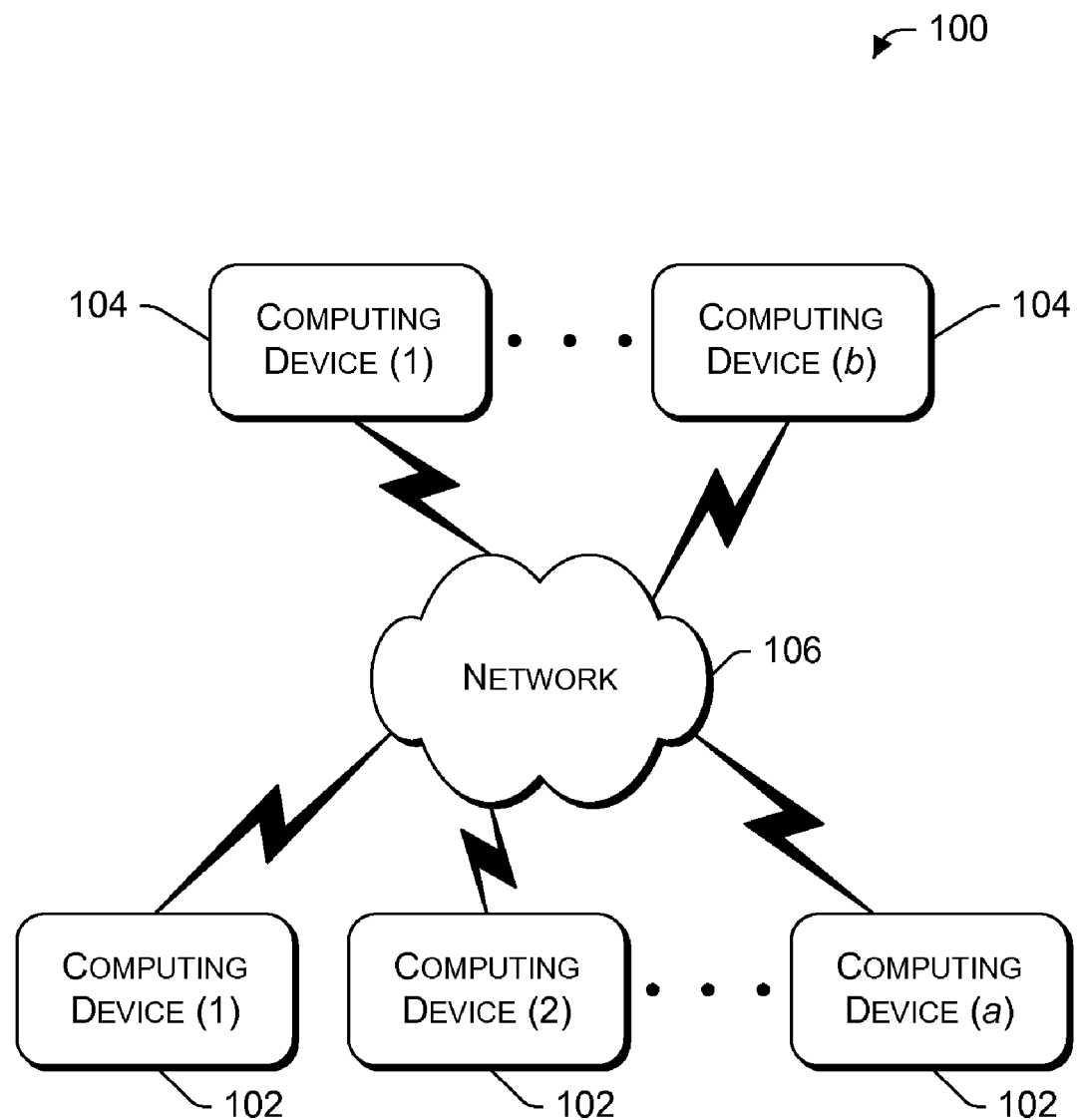
FIG. 1 illustrates an example system in which the non-mutating tree-structured file identifiers can be employed.

FIG. 1 illustrates an example system 100 in which the non-mutating tree-structured file identifiers described herein can be employed. System 100 includes multiple (a) computing devices 102 that can communicate with multiple (b) computing devices 104, as well as other computing devices 102, via a data communications network 106. Although multiple computing devices 102 and 104 are shown, alternatively system 100 may include only a single computing device 102 and/or a single computing device 104.

Computing devices 102 and 104 represent any of a wide range of computing devices, and each device may be the same or different. By way of example, devices 102 and 104 may be desktop computers, laptop computers, handheld or pocket computers, personal digital assistants (PDAs), cellular phones, Internet appliances, consumer electronics devices, gaming consoles, and so forth.

Network 106 represents any of a wide variety of data communications networks. Network 106 may include public portions (e.g., the Internet) as well as private portions (e.g., an internal corporate Local Area Network (LAN)), as well as combinations of public and private portions. Network 106 may be implemented using any one or more of a wide variety of conventional communications media including both wired and wireless media. Any of a wide variety of communications protocols can be used to communicate data via network 106, including both public and proprietary protocols. Examples of such protocols include TCP/IP, IPX/SPX, NetBEUI, etc.

The computing devices 104 together operate to provide directory server functionality to the computing devices in system 100. Each computing device 104 can be a directory server, or alternatively multiple computing devices 104 may operate together to form a single virtual server. The directory servers are responsible for maintaining (also referred to as managing) the non-mutating tree-structured file identifiers described herein, as discussed in more detail below. This maintenance or management includes, for example, recording a correspondence between the file identifiers and their corresponding file path names (as discussed in more detail below), recording the meta data for the files corresponding to the file identifiers (e.g., information describing the files, such as the name of the file, attributes of the file, timestamps for the file, where the file is physically located, and so forth), responding to requests for file identifiers, responding to requests to resolve file path names or file identifiers s (as discussed in more detail below), and so forth. The file identifiers also have associated data structures stored on the directory servers that store this meta data.

System 100 can employ a traditional client-server file system, in which the computing devices 104 are dedicated file server devices that are accessed by computing devices 102. Alternatively, system 100 can employ a serverless distributed file system, as discussed in more detail below.

Figure 2:
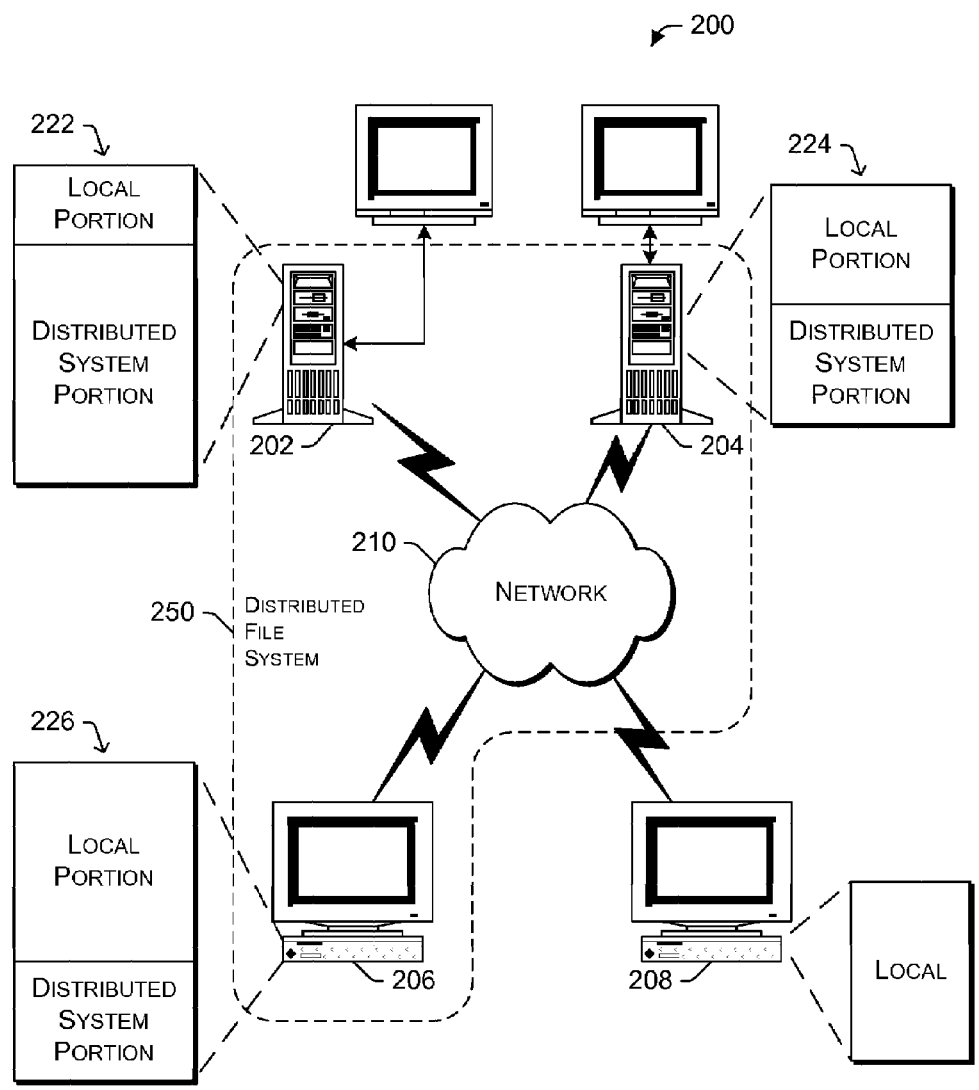
FIG. 2 illustrates an example network environment that supports a serverless distributed file system.

FIG. 2 illustrates an example network environment 200 that supports a serverless distributed file system. System 200 is an example implementation of system 100 of FIG. 1. Four computing devices 202, 204, 206, and 208 are coupled together via a data communications network 210. Analogous to the discussion above regarding network 106 of FIG. 1, data communications network 210 can be any of a wide variety of data communications network. Although four computing devices are illustrated, different numbers (either greater or fewer than four) may be included in network environment 200.

Computing devices 202-208 represent any of a wide range of computing devices, and each device may be the same or different. By way of example, devices 202-208 may be desktop computers, laptop computers, handheld or pocket computers, personal digital assistants (PDAs), cellular phones, Internet appliances, consumer electronics devices, gaming consoles, and so forth.

Two or more of devices 202-208 operate to implement a serverless distributed file system. The actual devices participating in the serverless distributed file system can change over time, allowing new devices to be added to the system and other devices to be removed from the system. Each device 202-206 that implements (participates in) the distributed file system 250 has portions of its mass storage device(s) (e.g., hard disk drive) 222-226 allocated for use as either local storage or distributed storage. The local storage is used for data that the user desires to store on his or her local machine and not in the distributed file system structure. The distributed storage portion is used for data that the user of the device (or another device) desires to store within the distributed file system structure.

A distributed file system 250 operates to store one or more copies of files on different computing devices 202-206. When a new file is created by the user of a computer, he or she has the option of storing the file on the local portion of his or her computing device, or alternatively in the distributed file system. If the file is stored in the distributed file system 250, the file will be stored in the distributed system portion of the mass storage device(s) of one or more of devices 202-206. The user creating the file may not have the ability to control which device 202-206 the file is stored on, nor any knowledge of which device 202-206 the file is stored on. Additionally, replicated copies of the file will typically be saved, allowing the user to subsequently retrieve the file even if one of the computing devices 202-206 on which the file is saved is unavailable (e.g., is powered-down, is malfunctioning, etc.).

The distributed file system 250 is implemented by one or more components on each of the devices 202-206, thereby obviating the need for any centralized server to coordinate the file system. These components operate to determine where particular files are stored, how many copies of the files are created for storage on different devices, and so forth. Exactly which device will store which files depends on numerous factors, including the number of devices in the distributed file system, the storage space allocated to the file system from each of the devices, how many copies of the file are to be saved, and so on. Thus, the distributed file system allows the user to create and access files (as well as folders or directories) without any knowledge of exactly which other computing device(s) the file is being stored on.

The distributed file system 250 is designed to prevent unauthorized users from reading data stored on one of the devices 202-206. Thus, a file created by device 202 and stored on device 204 is not readable by the user of device 204 (unless he or she is authorized to do so). In order to implement such security, the contents of files as well as all file and directory names in directory entries are encrypted, and only authorized users are given the decryption key. Thus, although device 204 may store a file created by device 202, if the user of device 204 is not an authorized user of the file, the user of device 204 cannot decrypt (and thus cannot read) either the contents of the file or the file name in its directory entry.

Every computing device 202-206 in distributed file system 250 can have one or more of the following functions: it can be a client for a local user, it can be a repository for encrypted copies of files stored in the system, and it can be a member of a group of computers that maintain one or more directories. The computing device(s) that operate to maintain the one or more directories can be thought of as directory servers, although it is to be appreciated that system 200 is a serverless system and that such computing device(s) are not part of a traditional client-server pair with a centralized server serving multiple clients. A computing device 202-206 operating as a directory server can also have one or more components that are not operating as a directory server.

Each file stored in system 100 of FIG. 1 and system 200 of FIG. 2 is identified by both a file identifier and a file path name. The file system, and programs interacting with the file system, use file identifiers when referring to files. The file path name associated with a file begins with a root and Lists each directory or folder in the path to where the file is stored. The file path names are more user-friendly; the system communicates with users in terms of file path names rather than the file identifiers.

Each of the file identifiers used in system 100 of FIG. 1 and system 200 of FIG. 2 is a string of integers. File identifiers have the following structure:

$$<X_1.X_2.X_3....X_n>$$

Each value x in this structure is an integer (although values other than integers could be used in alternate embodiments, such as fractions, alphabetical or alphanumeric character strings, and so on), and is referred to as a component of the file identifier. The value n represents how many components make up the file identifier. The string of integers in a file identifier can be arbitrarily long. Although periods are used herein to separate the components of the file identifier, other symbols may alternatively be used (e.g., other punctuation marks, letters, etc.). For discussion, we write file identifiers using the <1.3.2> notation; in a computing device, the same structure may be represented in other notation, such as in the encoded form described below.

The file identifiers discussed herein identify particular files or directories (or folders). The directory servers typically maintain file identifiers in the same manner for files and directories. Thus, although reference is made herein to file identifiers, it is to be appreciated that these file identifiers may identify files, directories, and/or folders.

The file identifiers are organized in a tree structure, and the root of this tree is the null sequence. Within the file identifier tree, file identifiers can have children and parent nodes (although the root node does not have a parent node). The children of a particular file identifier are those file identifiers having a prefix that is the same as the particular file identifier plus one additional integer added to the end of the string. The parent of a particular file identifier is that identifier that has one fewer integers and that has, except for the last integer in the string of the particular file identifier, the same integer string as the particular file identifier.

Figures 3, 7:
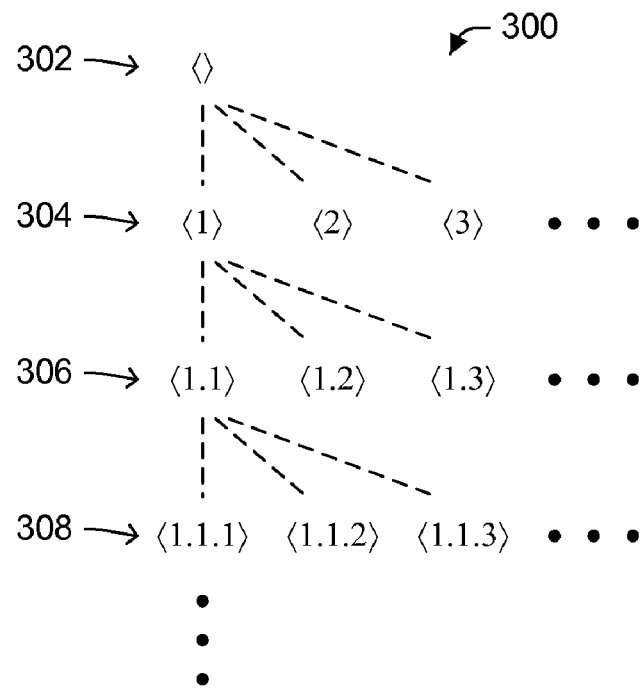
FIG. 3 illustrates an example of the non-mutating tree-structured file identifiers.
FIG. 7 illustrates an example file map.

FIG. 3 illustrates an example of the non-mutating tree-structured file identifiers. The tree structure as used herein refers to a multi-level structure having a relationship between different levels. Each file identifier in one level can have one or more children file identifiers in the next lower level, and typically has one parent file identifier in the next higher level. The file identifiers discussed herein are non-mutating—the file identifiers are static and do not change. As a system runs, it may use more identifiers, which are added in accordance with the tree structure. Files may also be renamed, but the file identifiers corresponding to those files do not change.

The file identifier tree 300 illustrated in FIG. 3 includes a root level 302 with a root file identifier shown as the null sequence (<>). The level below root level 302 is level 304, showing three example children of the root file identifier as file identifiers <1>, <2>, and <3>. The root file identifier can have any number of children. Each file identifier in level 304 can also have any number of children in level 306. Level 306 shows three example children of file identifier <1> as <1.1>, <1.2>, and <1.3>. File identifiers <2> and <3> can also have children in level 306, although these children are not shown in FIG. 3 to avoid cluttering the drawings.

Each file identifier in level 306 can also have any number of children in level 308. Level 308 shows three example children of file identifier <1.1> as <1.1.1>, <1.1.2>, and <1.1.3>. File identifiers <1.2> and <1.3>, as well as any children of file identifiers <2> and <3> in level 306, can also have children in level 308, although these children are not shown in FIG. 3 to avoid cluttering the drawings. Any number of additional levels can also be included in file identifier tree 300, with each file identifier in such an additional level having one integer more than the file identifiers at the previous level had.

As can be seen from the example in FIG. 3, the children of a particular file identifier (e.g., file identifier <1>) have the same prefix (<1>) as their parent with one additional integer added to the end of the string (e.g., <1.1>, <1.2>, and <1.3>). Additionally, the parent of a particular file identifier (e.g., file identifier <1.1.3>) can be identified by removing the last integer of the string (e.g., removing the integer 3 from <1.1.3>, resulting in a parent that is file identifier <1.1>).

Each file in the file system is identified in two separate ways: First, each file has an associated file identifier that remains constant for the lifetime of the file. Second, each file has a file path name, which begins with a root and lists each directory or folder in the path to where the file is stored. Each parent to child link in the file identifier tree may correspond to a particular component (e.g., directory name or file name) in the file path name. In those cases in which there is a correspondence between the file identifier tree and the namespace tree, the process of resolving file path names (described in detail below) is performed with greater efficiency than when this correspondence does not hold. The file identifiers are static—the file identifiers do not change and thus are referred to as non-mutating. Additional file identifiers may be added to the tree (e.g., a file identifier <1.1.1.1> or <2.1> may be added to tree 300 illustrated in FIG. 3), and files may be renamed, but the file identifiers do not change. On the other hand, the file namespace, which refers to the file path names, may change over time. Which particular file path names correspond to which particular file identifiers can change over time, but the file identifiers do not change.

Figure 4:
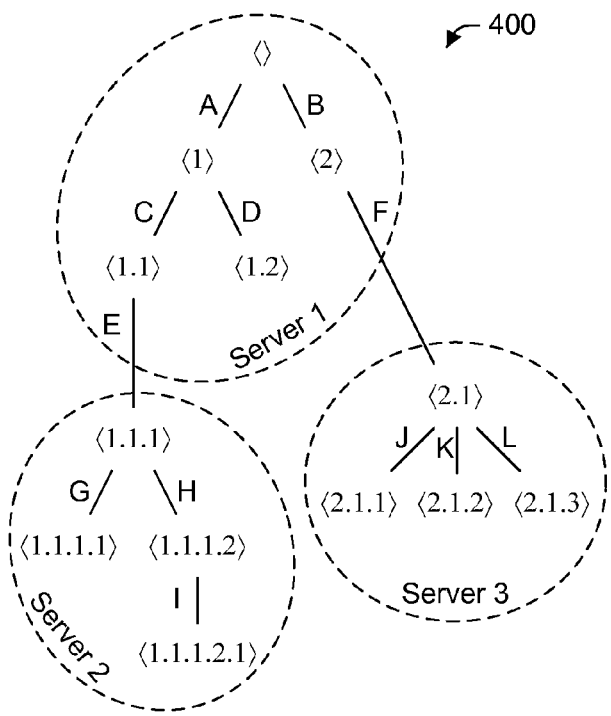
FIG. 4 illustrates an example implementation of a non-mutating file identifier tree and corresponding file path names.

FIG. 4 illustrates an example implementation of a non-mutating file identifier tree and corresponding file path names 400. In the example of FIG. 4, the file identifiers are managed by three different directory servers. Server 1 manages file identifiers <>, <1>, <2>, <1.1>, and <1.2>. Server 2 manages file identifiers <1.1.1>, <1.1.1.1>, <1.1.1.2>, and <1.1.1.2.1>. Server 3 manages file identifiers <2.1>, <2.1.1>, <2.1.2>, and <2.1.3>.

As can be seen in the example of FIG. 4, different file path names correspond to different file identifiers. In this example, each link between two file identifiers corresponds to a different component in the file path name; however, this need not be the case in general. The file path name components are not part of the non-mutating file identifier tree structure. Rather, a separate record of the correspondence between the links between the file identifiers and the file path name components is maintained by the directory servers.

Table I below shows a file path name to file identifier mapping for the example of FIG. 4. The slash is added to the file path names to identify the separation between different components in the file path names.

TABLE I

| File Path Name | File Identifier |
| --- | --- |
| /A | <1> |
| /B | <2> |
| /A/C | <1.1> |
| /A/D | <1.2> |
| /A/C/E | <1.1.1> |

TABLE I-continued

| File Path Name | File Identifier |
|---|---|
| /A/C/E/G | <1.1.1.1> |
| /A/C/E/H | <1.1.1.2> |
| /A/C/E/H/I | <1.1.1.2.1> |
| /B/F | <2.1> |
| /B/F/J | <2.1.1> |
| /B/F/K | <2.1.2> |
| /B/F/L | <2.1.3> |

Figure 5:
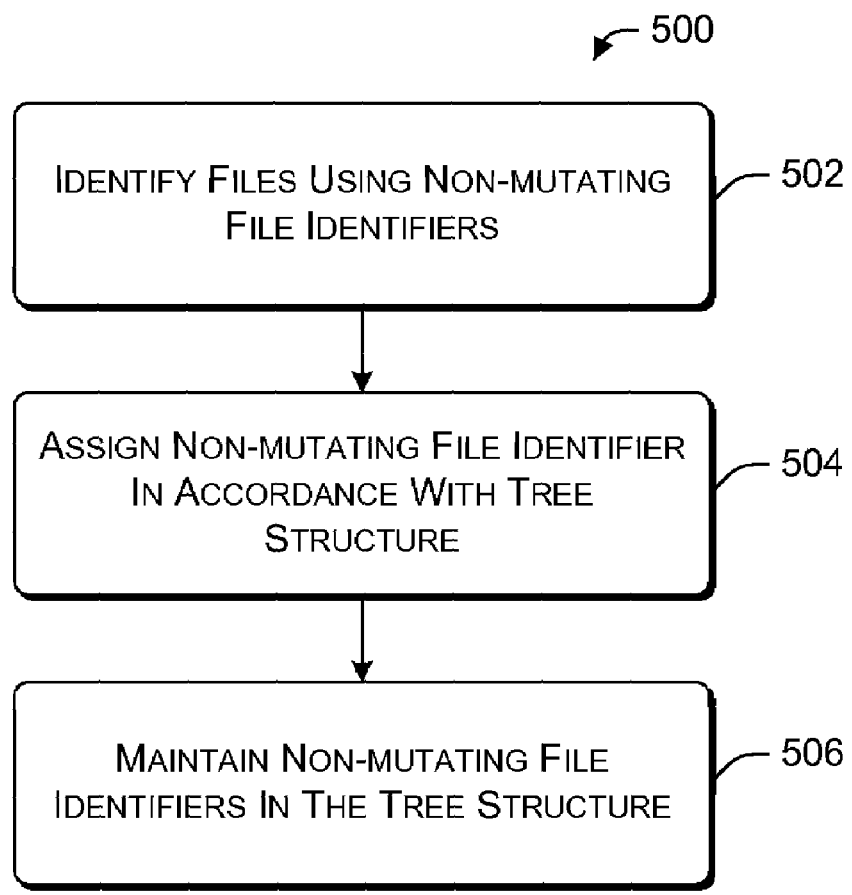
FIG. 5 is a flowchart illustrating an example process for using the non-mutating tree-structured file identifiers in a file system.

FIG. 5 is a flowchart illustrating an example process 500 for using the non-mutating tree-structured file identifiers discussed herein in a file system. Process 500 may be implemented in software, firmware, hardware, or combinations thereof. Process 500 is performed by a directory server, such as a computing device 104 of FIG. 1, or one of devices 202, 204, and 206 of FIG. 2.

Files in a file system are identified using non-mutating file identifiers (act 502). One or more of the directory servers in the file system assigns a non-mutating file identifier to new files in accordance with the tree structure (act 504). Typically the directory server that will manage the new file identifier assigns the file identifier in act 504. Oftentimes this is the same directory server as manages the parent file identifier of the new file identifier, although alternatively it may be a different file server.

When assigning a new file identifier, an integer is added to the string of integers that is the parent file identifier of the new file identifier. This new integer is chosen so that the new file identifier is unique in the file system. In certain embodiments, the directory server may start with a value of zero or one for the integer chosen for the first new file identifier it creates, and then continue by incrementing by one the value used for the most recently created file identifier. Alternatively, other formulas or patterns may be followed in selecting integer values.

The directory servers in the file system maintain the non-mutating file identifiers in the tree structure (act 506). This tree structure is maintained even though additional files may be added (in which case acts 502 and 504 are repeated), files may be deleted, files may be moved, additional directory servers may be added, directory servers may be removed, and so forth.

Files in the file system are generally identified to users of the computing devices using their file path names. In order to operate on a particular file, such as open the file for viewing or editing by the user, a computing device obtains the file identifier for that file. Once the file identifier is obtained, the computing device can operate on that file by interacting with the file system and referring to that file using the file identifier of that file. The process of obtaining the file identifier corresponding to a particular file path name is also referred to as resolving the file path name.

File path names are resolved by accessing one or more directory servers. Each directory server knows the file identifiers for all of the files that it manages, and it also knows the names of the children of each of these files, but not necessarily their full path names. For example, referring to FIG. 4, server 2 knows that the file with file identifier <1.1.1> has a child named G with file identifier <1.1.1.1>, but it does not know that the full path name of this file is /A/C/E/G. In addition, each directory server keeps a record of the directory server that manages the next child (if any) of each of the file identifiers it manages. For example, referring to FIG. 4, server 1 maintains a record that file identifier <1.1.1>, corresponding to file path name /A/C/E, is managed by server 2, and also maintains a record that file identifier <2.1>, corresponding to file path name /B/F, is managed by server 3.

Figure 6:
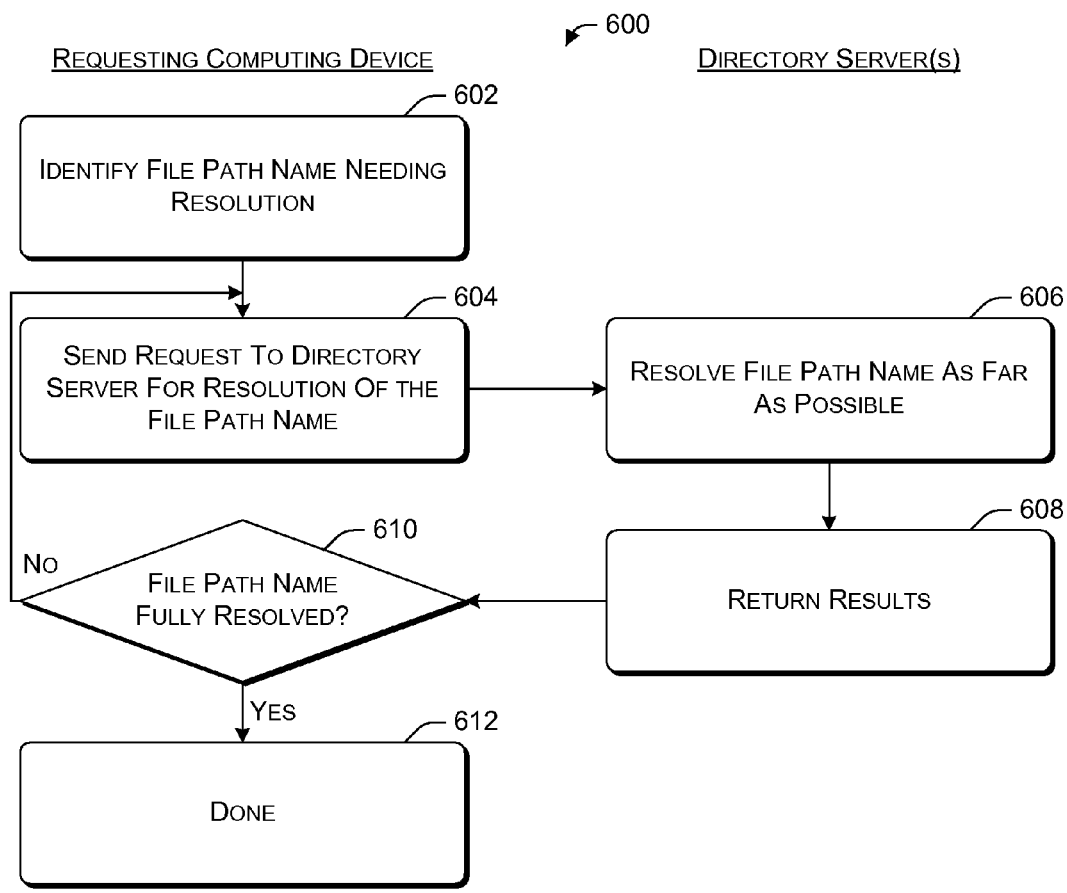
FIG. 6 is a flowchart illustrating an example process for resolving a file path name.

FIG. 6 is a flowchart illustrating an example process 600 for resolving a file path name. Process 600 may be implemented in software, firmware, hardware, or combinations thereof. Process 600 is performed by a requesting computing device (such as a computing device 102 of FIG. 1, or one of devices 202, 204, and 206 of FIG. 2) and by one or more directory servers (such as a computing device 104 of FIG. 1, or one of devices 202, 204, and 206 of FIG. 2). Operations performed by the requesting computing device are shown on the left-hand side of FIG. 6, while operations performed by the directory server(s) are shown on the right-hand side of FIG. 6.

Initially, the requesting computing device identifies the file path name needing resolution (act 602). This need can arise, for example, due to an application or user requesting access to the file having the file path name. The requesting computing device sends a request for resolution of the file path name to one of the directory servers (act 604). The first directory server that this request is sent to is the directory server that manages the root file identifier (the identity of this directory server is known to all of the computing devices in the file system). The directory server receives the request and identifies the corresponding file identifier for as much of the file path name as it can (act 606). The directory server then returns the results to the requesting computing device (act 608). These results typically include an indication of what portion of the file path name the directory server could resolve and the file identifier corresponding to that portion. These results may also include an identifier of the directory server that manages the next file identifier in the file path name beyond that which the directory server could resolve.

The requesting computing device analyzes the results and determines if the fall path name has been resolved (act 610). If the full path name has been resolved, then the file path name resolution process is complete (act 612). However, if the full path name has not been resolved, then the requesting computing device sends a request for resolution of the remainder of the file path name (the portion of the file path name that was not resolved by the directory server) to another directory server (act 604). This request also includes where this other directory server should begin its search (e.g., beginning with the file identifier that was returned in act 608). This other directory server is the directory server that manages the next file identifier in the file path name beyond that which the previously accessed directory server could resolve. This other directory server may be identified by the previously accessed directory server (e.g., identified in the results returned in act 608), or alternatively may be identified in other manners (such as by use of a file map mapping file identifiers to directory servers, which is discussed in more detail below).

Acts 604-610 are repeated until the requesting computing device receives the fully resolved file path name.

The process of resolving a file path name can be shown by way of example with reference to FIG. 4. Assume that a computing device desires to resolve the file path name /A/C/E/H/I. The computing device initially accesses server 1 (which manages the root file identifier), and requests the file identifier for /A/C/E/H/I from server 1. Server 1 does not manage the file identifier for /A/C/E/H/I and thus does not know the file identifier for /A/C/E/H/I. However, server 1 does manage part of the file path name /A/C/E/H/I (particularly, /A/C), and knows that server 2 manages /A/C/E, which corresponds to file identifier <1.1.1>. Server 1 returns an indication to the requesting computing device that server 2 manages /A/C/E, which corresponds to file identifier <1.1.1>.

The requesting computing device then requests, from server 2, the file identifier for the file path name /H/I relative to file identifier <1.1.1>. Server 2 manages the file identifier for /H/I relative to file identifier <1.1.1>, and returns the requested file identifier <1.1.1.2.1> to the requesting computing device. As this fully resolves the file path name, the resolution process is finished.

In addition to resolving file path names, situations can also arise where a computing device desires to know which directory server is responsible for managing a particular file identifier. The process of obtaining an indication of the directory server that is responsible for managing a particular file identifier is also referred to as resolving the file identifier. When such a situation arises, the computing device can access the directory server that manages the root file identifier, and proceed through querying additional directory servers in a manner analogous to that discussed above with respect to FIG. 6 (except that the process is concerned only with the file identifiers and the servers that manage them, not the corresponding file path names). Alternatively, the computing device may make use of a file map that maps file identifiers to the directory servers that manage those file identifiers.

FIG. 7 illustrates an example of a file map 700. File map 700 is discussed with reference to the tree structure 400 of FIG. 4. File map 700 includes a first entry 702 that maps the root file identifier to the server that manages the root file identifier, which is server 1 in this example. In certain embodiments, all computing devices have a file map 700 that includes at least this first entry 702. Additional entries in file map 700 can vary for different computing devices.

File map 700 also includes an entry 704 that maps the file identifier <1.1> to the server that manages the file identifier <1.1>, which is server 1 in this example. File map 700 also includes an entry 706 that maps the file identifier <1.1.1> to the server that manages the file identifier <1.1.1>, which is server 2 in this example. File map 700 also includes an entry 708 that maps the file identifier <2.1> to the server that manages the file identifier <2.1>, which is server 3 in this example.

Figure 8:
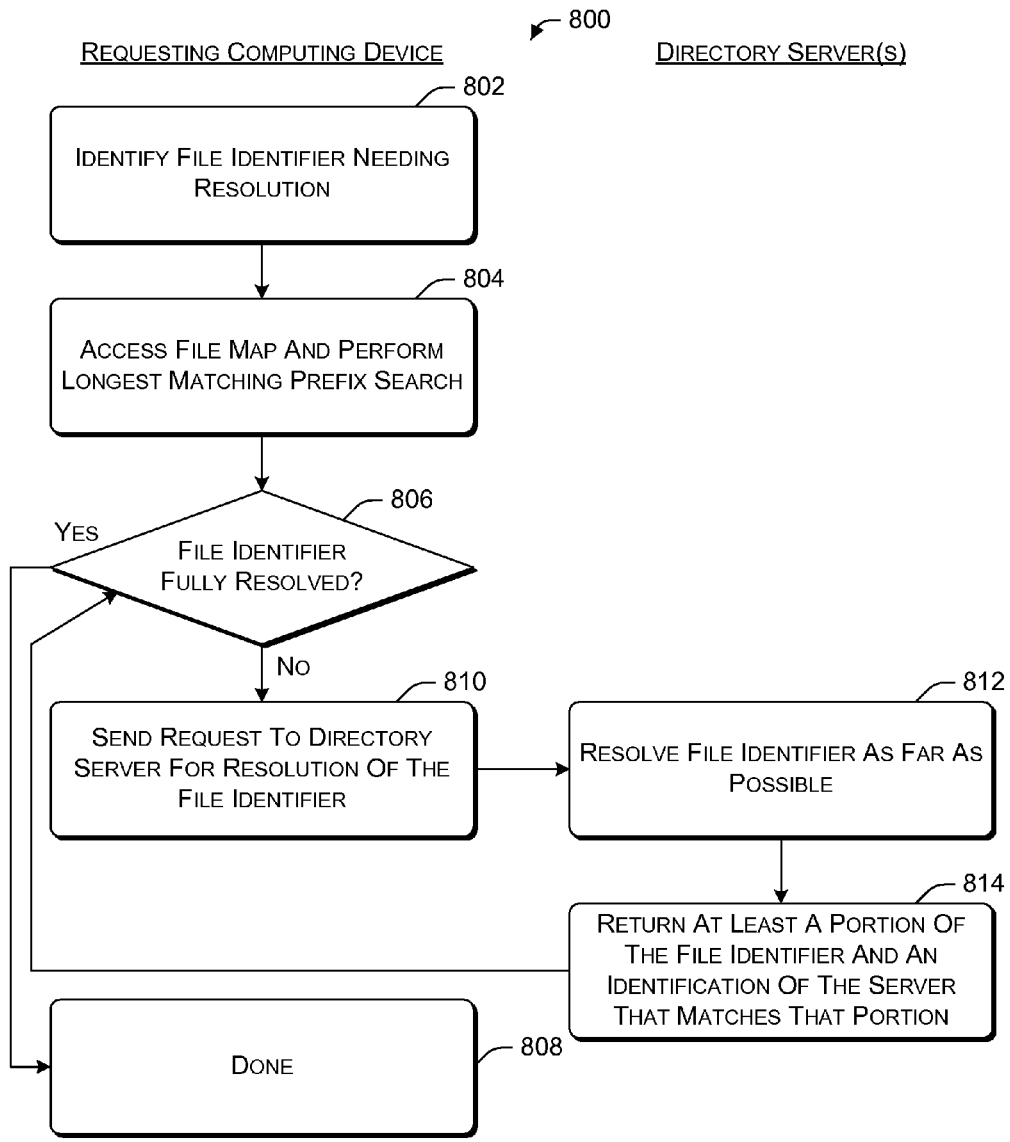
FIG. 8 is a flowchart illustrating an example process for resolving a file identifier.

FIG. 8 is a flowchart illustrating an example process 800 for resolving a file identifier that employs a file map. Process 800 may be implemented in software, firmware, hardware, or combinations thereof. Process 800 is performed by a requesting computing device (such as a computing device 102 of FIG. 1, or one of devices 202, 204, and 206 of FIG. 2) and by one or more directory servers (such as a computing device 104 of FIG. 1, or one of devices 202, 204, and 206 of FIG. 2). Operations performed by the requesting computing device are shown on the left-hand side of FIG. 8, while operations performed by the directory server(s) are shown on the right-hand side of FIG. 8.

Initially, the requesting computing device identifies the file identifier needing resolution (act 802). The requesting computing device accesses a file map and performs a longest matching prefix search (act 804). The longest matching prefix search identifies the longest file identifier in the file map that matches the file identifier needing resolution. The requesting computing device then checks whether the file identifier is fully resolved (act 806). If the file identifier from the file map is the same as the file identifier needing resolution, then the file identifier is fully resolved. If the file identifier has been fully resolved, then the file identifier resolution process is complete (act 808).

However, if the file identifier has not been fully resolved, then the requesting computing device sends a request to a directory server for resolution of the file identifier (act 810). The directory server to which the request is sent is the directory server that manages as much of the file identifier as has been resolved (e.g., the directory server that manages the longest matching prefix from the file map). The directory server resolves the file identifier as far as possible (act 812), and returns an indication of what portion of the file identifier it could resolve and an identification of the directory server that manages that portion (act 814).

The requesting computing device then checks whether the file identifier is fully resolved (act 806). If the portion of the file identifier that the directory server could resolve, when combined with any previously resolved portions, is the entire file identifier, then the file identifier is fully resolved. If the file identifier has been fully resolved, then the file identifier resolution process is complete (act 808). However, if the file identifier has not been fully resolved, then the requesting computing device sends a request to another directory server for resolution of the file identifier (act 810). This other directory server is the directory server that was returned by the previously accessed directory server.

Acts 806-814 are repeated until the requesting computing device receives the fully resolved file identifier.

The process of resolving a file identifier can be shown by way of example with reference to FIGS. 4 and 7. Assume that a computing device desires to know which directory server is responsible for managing the file identifier <1.1.1.2.1>, and further assume that the computing device has the file map 700 of FIG. 7. The computing device performs a longest matching prefix search comparing the file identifier <1.1.1.2.1> to the file identifiers in file map 700. The longest matching prefix search identifies the file identifier in file map 700 that has the longest string of integers (from the beginning of the strings) that matches the string of integers in the file identifier <1.1.1.2.1>. As seen in file map 700, two different file identifiers match the string integers in the file identifier <1.1.1.2.1>: file identifier <1.1> in entry 704, and file identifier <1.1.1> in entry 706. As the file identifier <1.1.1> is a longer string of integers than the file identifier <1.1>, the longest matching prefix search returns entry 706. The computing device can then send a request to server 2 asking for server 2 to identify which directory server manages the file identifier <1.1.1.2.1>. As server 2 manages file identifier <1.1.1.2.1>, server 2 returns to the requesting computing device an indication that directory server 2 manages file identifier <1.1.1.2.1>. If server 2 did not manage file identifier <1.1.1.2.1>, then server 2 would identify which directory server manages as much of the integer string as it has knowledge of, and then notifies the requesting computing device of which directory server to query next in continuing the file identifier resolution.

It should be noted that, by making use of file maps such as file map 700, some of the burden of performing the file identifier resolution can be shifted from the directory servers to the requesting computing devices. As can be seen in the previous example, because of the entry in the file map that indicates server 2 manages file identifier <1.1.1>, the directory server managing the root file identifier did not need to be accessed in order to resolve the file identifier.

Returning to FIG. 4, one operation that is sometimes performed in file systems is referred to as a move operation (also referred to as a rename operation). In a move operation, the file path name is changed so that one or more components of the file path name are altered. For example, a move operation may change the file path name /A/C to the file path name /B/C. Such move operations change the file path names, but they do not alter the non-mutating file identifiers.

Figure 9:
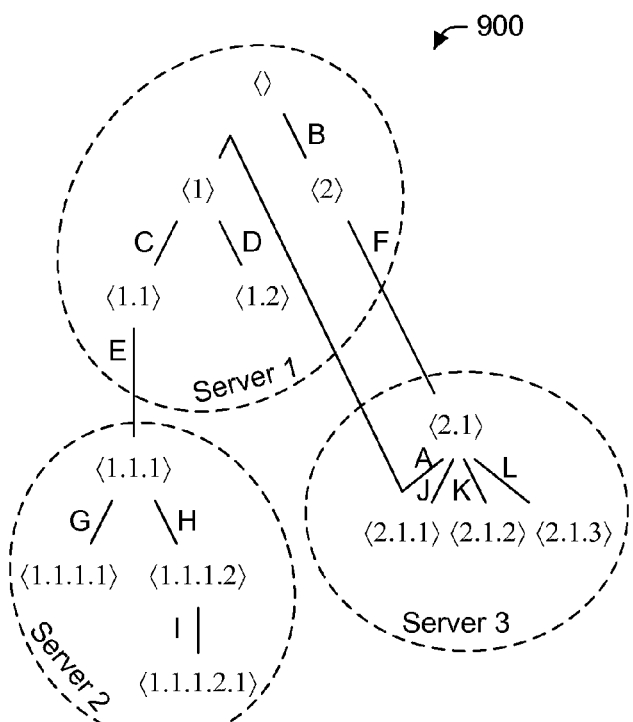
FIG. 9 illustrates another example implementation of a non-mutating file identifier tree and corresponding file path names.

An example of a move operation is illustrated in FIGS. 4 and 9. Assume that a move operation is going to be applied to the non-mutating file identifier tree and corresponding file path names as illustrated in FIG. 4. The move operation will be changing /A to /B/F/A. Note also that this move operation changes all of the file path names that begin with /A—all of these file path names will change to begin with /B/F/A. The result of the move operation is shown in the non-mutating file identifier tree and corresponding file path names 900 of FIG. 9. The link between <> and <1> in the file identifier tree no longer represents the file path name A. The file path name has changed from /A to /B/F/A, but the file identifier has not changed—the file identifier remains <1>.

It should be noted that the move operation can occur across different directory servers. For example, referring to FIGS. 4 and 9, the file path name /A having a corresponding file identifier <1> being managed by server 1 was renamed to the file path name /B/F/A. A portion of the file path name /B/F/A, however, is managed by server 3. The move operation is still allowed to occur, with the file identifier <1> being managed by server 1 even though the file path name /B/F/A includes a portion that is not managed by server 1.

It should also be noted that the non-mutating tree-structured file identifiers discussed herein support multiple cross-server links into a particular directory server. Multiple different file path names can link into a particular directory server at different points. In other words, although the file system itself has a single root file identifier, each individual server can have multiple local roots. Each of these multiple local roots serves as a starting point in the directory server for file path name resolution.

For example, referring to FIG. 9, there are two links or entry points into server 1: one entry point or link is at the root file identifier <>, and the second entry point or link is at the file identifier <1>. Any file path name resolution requests that begin with /B/F/A will begin at file identifier <1>, while any other file path name resolution requests that begin with the root directory will begin at the root file identifier <>.

It should further be noted that, when using the non-mutating tree-structured file identifiers discussed herein, any move or rename operation involves three file identifiers: the old parent file identifier, the new parent file identifier, and the child file identifier being moved. No other file identifiers need be involved. As illustrated in FIGS. 4 and 9, when /A was renamed to /B/F/A, the move operation involved the old parent file identifier (the root file identifier <>, which had the correspondence to /A of its link to file identifier <1> removed), the new parent file identifier (<2.1>, which had a new correspondence to /A added), and the child file identifier (<1>, which now has a correspondence to /B/F/A rather than /A).

The file identifiers in the non-mutating tree-structured file identifiers discussed so far are strings of components with each component typically being an integer. Oftentimes, however, it is desirable to work with numbers as file identifiers rather than data structures that include multiple different components. Accordingly, in certain embodiments the file identifiers are encoded so that the string of integers is represented by a single number.

Figure 10:
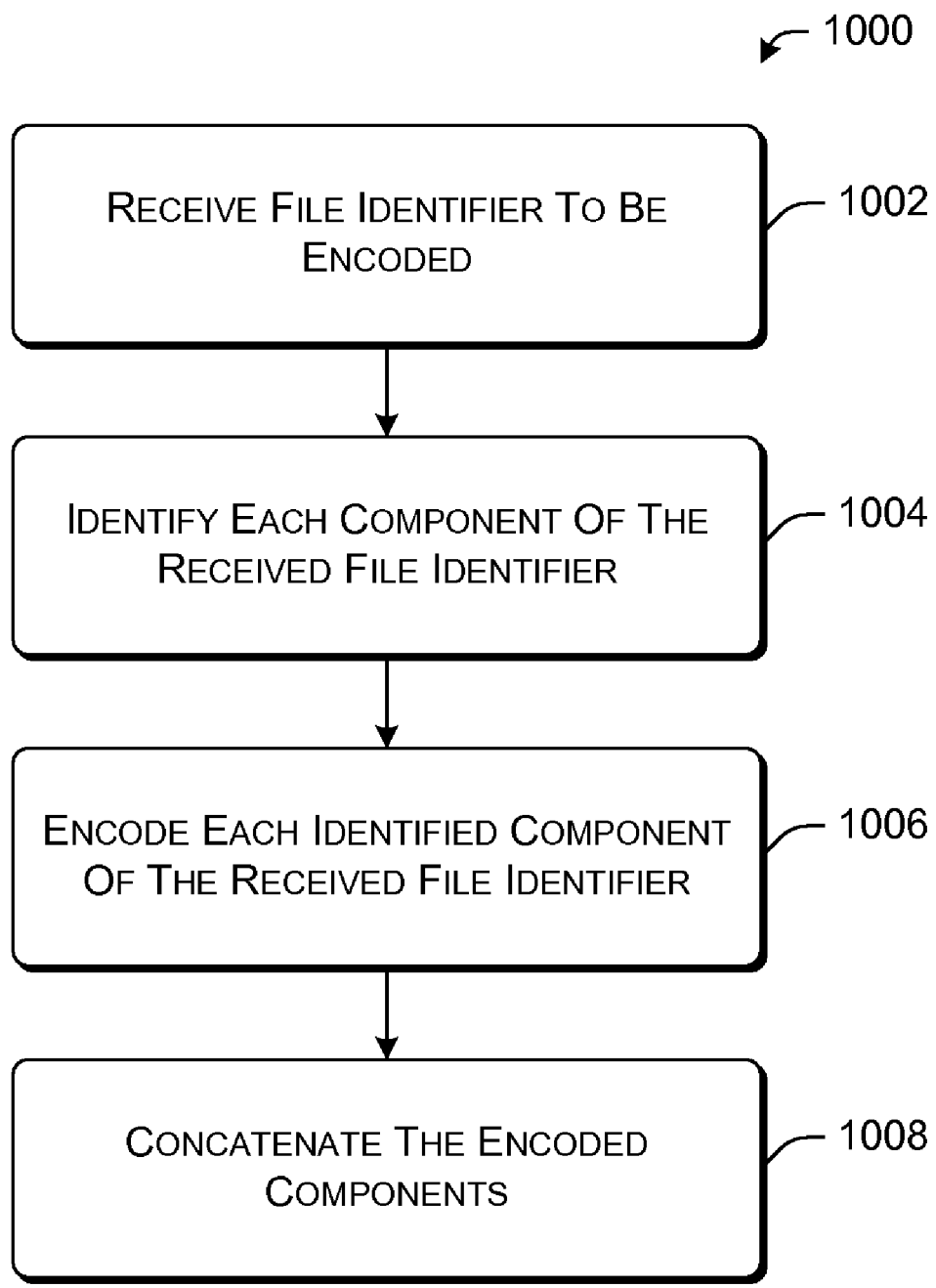
FIG. 10 is a flowchart illustrating an example process for encoding a file identifier.

FIG. 10 is a flowchart illustrating an example process 1000 for encoding a file identifier. Process 1000 may be implemented in software, firmware, hardware, or combinations thereof. Process 1000 is performed by a computing device, such as a computing device 102 of FIG. 1, or one of devices 202, 204, and 206 of FIG. 2.

Initially, the file identifier to be encoded is received (act 1002). Each component of the file identifier is identified (act 1004) and encoded separately (act 1006). These encoded components are then combined together to generate the encoded file identifier (act 1008). This combination can be performed in different manners, and typically is performed by concatenating the encoded components in the same order as they appear in the file identifier.

The components of the file identifier can be encoded in act 1006 using different techniques. One such technique is using a prefix code process that allows the various encoded components to be concatenated together into a single number, yet makes it readily determinable where the different encoded components reside in the single number. In addition, other encoding techniques could alternatively be used that allow multiple (e.g., all) components of the file identifier to be encoded together rather than encoding the individual components separately as illustrated in FIG. 10.

Figure 11:
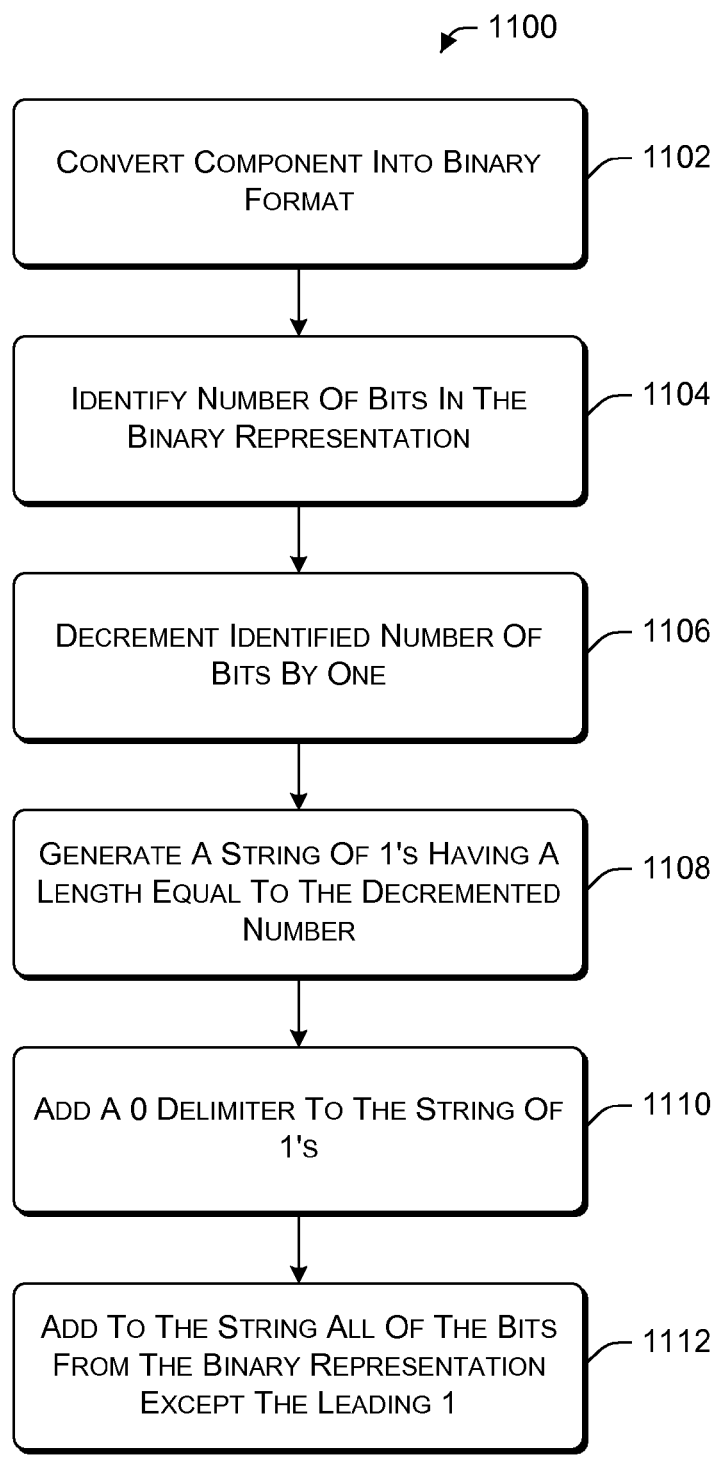
FIG. 11 is a flowchart illustrating an example process for encoding a component of a file identifier.

FIG. 11 is a flowchart illustrating an example process 1100 for encoding a component of a file identifier. Process 1100 illustrates an example of act 1006 of FIG. 10 in additional detail. Process 1100 may be implemented in software, firmware, hardware, or combinations thereof. Process 1100 is performed by a computing device, such as a computing device 102 of FIG. 1, or one of devices 202, 204, and 206 of FIG. 2.

Initially, the component is converted into binary format (act 1102). The number of bits in the binary representation is then identified (act 1104), and this number is decremented by one (act 1106). A string of 1's is then generated having a length equal to the decremented number determined in act 1106 (act 1108). A zero delimiter is added to the end of the string of 1's generated in act 1108 (act 1110). Next, all of the bits from the binary representation of the number from act 1102, except for the leading 1, are added to the end of the string of 1's (act 1112), resulting in a string of bits that is the encoded component in binary form.

Table II illustrates example encodings of components using process 1100.

TABLE II

| Component (base 10) | Encoded Component (binary) |
| --- | --- |
| 1 | 0 |
| 2 | 100 |
| 3 | 101 |
| 4 | 11000 |
| 5 | 11001 |
| 6 | 11010 |
| 7 | 11011 |

At times, it may also be desirable to decode the encoded file identifiers so that the strings of integers that are the file identifiers can be accessed. Typically an entire encoded file identifier would be decoded, but alternatively only individual encoded components of the encoded file identifier may be decoded.

Figure 12:
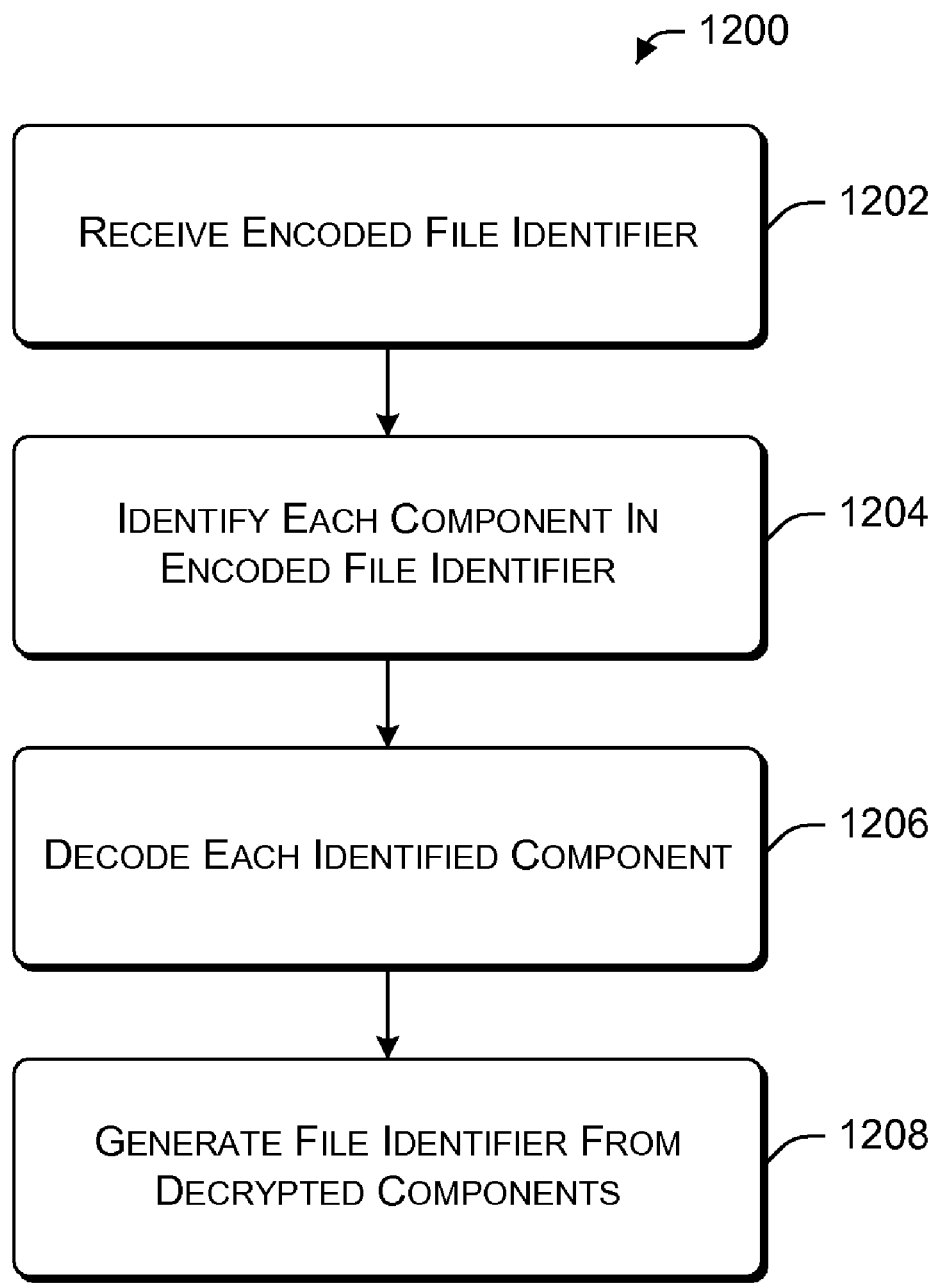
FIG. 12 is a flowchart illustrating an example process for decoding an encoded file identifier.

FIG. 12 is a flowchart illustrating an example process 1200 for decoding an encoded file identifier. Process 1200 may be implemented in software, firmware, hardware, or combinations thereof Process 1200 is performed by a computing device, such as a computing device 102 of FIG. 1, or one of devices 202, 204, and 206 of FIG. 2.

Initially, an encoded file identifier is received (act 1202). Each component in the encoded file identifier is then identified (act 1204). The manner in which the components of the file identifier were previously encoded allows the encoded components to be readily identified. When the components are encoded using process 1100 of FIG. 11, the encoded file identifier is analyzed from the beginning of the identifier. The number of bits in each encoded component is determined by the calculation 2y+1, where y represents how many 1's there are before the first 0 in the encoded file identifier. These 1's before the first 0, as well as the first 0 and the number of bits following that first 0 (as determined by the 2y+1 calculation above) are the bits that are identified as being the component. This process is then applied to the remaining bits in the encoded file identifier to identify the remaining components in the encoded file identifier.

Each identified component is then decoded (act 1206), and these decoded components are used to generate the file identifier (act 1208). The file identifier is generated by using each decoded component as an integer in the string of integers that is the file identifier. The decoded components are typically used in the string of integers in the same order as the encoded components appeared in the encoded file identifier.

Alternatively, the components of the file identifier can be decoded in act 1206 using different techniques. The particular technique(s) used to decode the encoded file identifier and the individual components of the encoded file identifier will vary based on the particular technique(s) used to encode the file identifier and the individual components of the file identifier.

Figure 13:
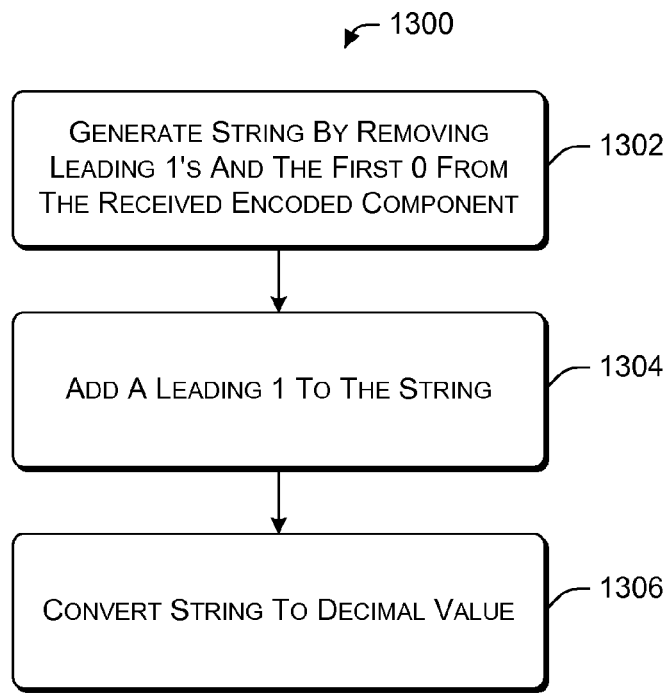
FIG. 13 is a flowchart illustrating an example process for decoding an encoded component of a file identifier.

FIG. 13 is a flowchart illustrating an example process 1300 for decoding an encoded component of a file identifier. Process 1300 illustrates an example of act 1206 of FIG. 12 in additional detail. Process 1300 may be implemented in software, firmware, hardware, or combinations thereof. Process 1300 is performed by a computing device, such as a computing device 102 of FIG. 1, or one of devices 202, 204, and 206 of FIG. 2.

Initially a string is generated by removing the leading 1's and the first 0 from the encoded component (act 1302). The leading 1's refer to the 1's in the encoded component before (to the left of) the first 0. A leading 1 is then added to the string generated in act 1302 (act 1304), resulting in the decoded component in binary form. The string is then converted to decimal value (act 1306).

For example, if the value 7 were to be encoded using the processes 1000 and 1100 of FIGS. 10 and 11, the encoded value would be $11011_2$. In decoding this encoded value using process 1300 of FIG. 13, the leading 1's and the first 0 are removed to generate a string $11_2$. A leading 1 is then added to this string, resulting in the value $111_2$, which is the decimal value 7.

By way of another example, referring to processes 1000 and 1100 of FIGS. 10 and 11, assume that a file identifier 2.1.3 is to be encoded. The component 2 would be encoded to $100_2$, the component 1 would be encoded to $0_2$, and the component 3 would be encoded to $101_2$. These three encoded components would then be concatenated together to form the value $1000101_2$, which is the encoded file identifier.

Continuing with this example, assume that the value $1000101_2$ is to be decoded using processes 1200 and 1300 of FIGS. 12 and 13. There is a single 1 before the first 0, indicating that there are 3 bits in the first encoded component. The first three bits of $1000101_2$, which are $100_2$, are the first encoded component. The remaining bits are analyzed to determine the remaining components. There are no 1's before the next 0, indicating that there is 1 bit in the next encoded component. The next 1 bit of the remaining bits ($0101_2$), which is $0_2$, is the second encoded component. The remaining bits are then analyzed to determine the remaining components. There is one 1 before the next 0, indicating that there are 3 bits in the next encoded component. The next three bits, which are $101_2$, are the third encoded component. As there are no remaining bits to analyze, there are no additional encoded components in the encoded file identifier.

To decode the first encoded component, $100_2$, the leading 1 and the first 0 are removed, then a leading 1 is added to the remaining bits, resulting in a value of $10_2$, which is decimal 2. To decode the second encoded component, $0_2$, there are no leading 1's to remove, so the first (and only) 0 is removed, then a leading 1 is added, resulting in a value of $1_2$, which is decimal 1. To decode the third encoded component, $101_2$, the leading 1 and the first 0 are removed, then a leading 1 is added to the remaining bits, resulting in a value of $11_2$, which is decimal 3. These decimal values are then combined into a string of integers, 2.1.3, which is the decoded file identifier.

It should be noted that one benefit to using the processes of FIGS. 10-13 for decoding and encoding file identifiers is that when sorting the encoded file identifiers using any of a variety of conventional sorting techniques, the order of the sorted identifiers is the same for both the non-encoded file identifiers and the encoded file identifiers. In particular, the numerical sort order of the encoded identifiers matches the lexicographical sort order of the non-encoded identifiers. This allows the file identifiers to be sorted when they are in encoded form, and have the same order as if they were sorted when not in encoded form.

Figure 14:
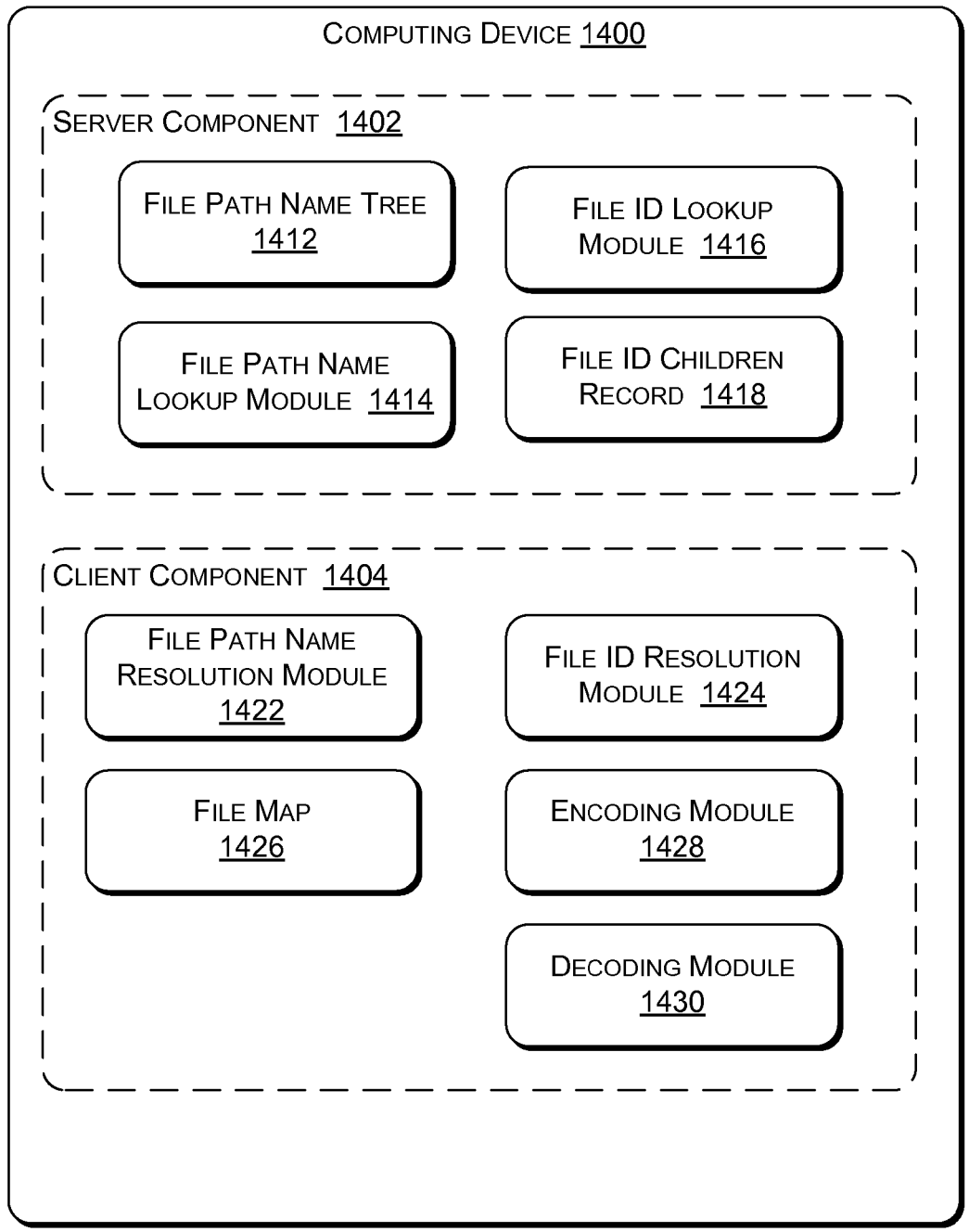
FIG. 14 illustrates logical components of an example computing device that is representative of a computing device that participates in a distributed file system.

FIG. 14 illustrates logical components of an example computing device 1400 that is representative of any one of the devices 202-206 of FIG. 2 that participate in the distributed file system 250. Computing device 1400 includes a server component 1402 and a client component 1404. Server component 1402 and client component 1404 can exist in different parts of a computing device. For example, software instructions for implementing components 1402 and 1404 may be stored on a mass storage device until computing device 1400 is powered on, at which point the software instructions are copied into random access memory (RAM). Computing device 1400 also typically includes additional components (e.g., a processor, RAM, read only memory (ROM), a mass storage device(s), etc.), however these additional components have not been shown in FIG. 14 so as not to clutter the drawings. Alternatively, one or more components 1402 and 1404, or portions thereof may be implemented in hardware. A more general description of a computer architecture with various hardware and software components is described below with reference to FIG. 15.

Computing device 1400 is intended to be used in a serverless distributed file system, and as such includes both a server component 1402 and a client component 1404. Server component 1402 handles requests when device 1400 is responding to a request involving a file or directory entry stored (or to be stored) in a storage device of computing device 1400, while client component 1404 handles the issuance of requests by device 1400 for files or directories stored (or to be stored) in the distributed file system. Client component 1404 and server component 1402 operate independently of one another. Thus, situations can arise where the serverless distributed file system 250 causes files being stored by client component 1404 to be stored in a mass storage device of computing device 1400 by server component 1402. Situations can also arrive where server component 1402 is operating as a directory server and client component 1404 is operating as a requesting computing device (e.g., in processes 600 and 800 of FIGS. 6 and 8 discussed above).

Server component 1402 includes a file path name tree 1412, a file path name lookup module 1414, a file identifier (ID) lookup module 1416, and a file ID children record 1418. It should be noted that in certain embodiments not all computing devices in a distributed file system need include a name tree 1412, module 1414 and 1416, and record 1418. Rather, only those computing devices that may be configured to operate as, or that are actually operating as, a directory server may include these components. Additional components may also be included in server component 1402, such as components for encrypting files, storing files, determining locations of files, and so forth. However, these components have not been illustrated in FIG. 14 in order to avoid cluttering the drawings.

File path name tree 1412 maintains a correspondence between the file path name and the file identifiers that are managed by server component 1402 of computing device 1400. File path name lookup module 1414 resolves file path names in response to received requests. Module 1414 can perform, for example, the acts discussed as carried out by a directory server in process 600 of FIG. 6 discussed above.

File ID lookup module 1416 resolves file identifiers in response to received requests. Module 1416 can perform, for example, the acts discussed as carried out by a directory server in process 800 of FIG. 8 discussed above. File ID children record 1418 is a record of the directory server(s) that manage the next child (if any) of each of the file identifiers managed by server component 1402. For example, if computing device 1400 were server 1 of FIG. 4, then record 1418 is a record that server 2 manages file identifier <1.1.1>, and that server 3 manages file identifier <2.1>.

Client component 1404 includes a file path name resolution module 1422, a file identifier resolution module 1424, a file map 1426, an encoding module 1428, and a decoding module 1430. Additional components may also be included in client component 1404, such as components for creating files and directories, storing files and directories, retrieving files and directories, reading files and directories, writing files and directories, modifying files and directories, verifying files and directories, and so forth. However, these components have not been illustrated in FIG. 14 in order to avoid cluttering the drawings.

File path name resolution module 1422 obtains resolved file path names. Module 1422 can perform, for example, the acts discussed as carried out by the requesting computing device in process 600 of FIG. 6 discussed above. File ID resolution module 1424 obtains resolved file identifiers. Module 1424 can perform, for example, the acts discussed as carried out by the requesting computing device in process 800 of FIG. 8 discussed above.

File map 1426 is a mapping of file identifiers to directory servers. An example of file map 1426 is illustrated as file map 700 of FIG. 7 discussed above. Encoding module 1428 encodes file identifiers. Encoding module 1428 can perform, for example, process 1000 of FIG. 10 and process 1100 of FIG. 11 discussed above. Decoding module 1430 decodes encoded file identifiers. Decoding module 1430 can perform, for example, process 1200 of FIG. 12 and process 1300 of FIG. 13 discussed above.

Figure 15:
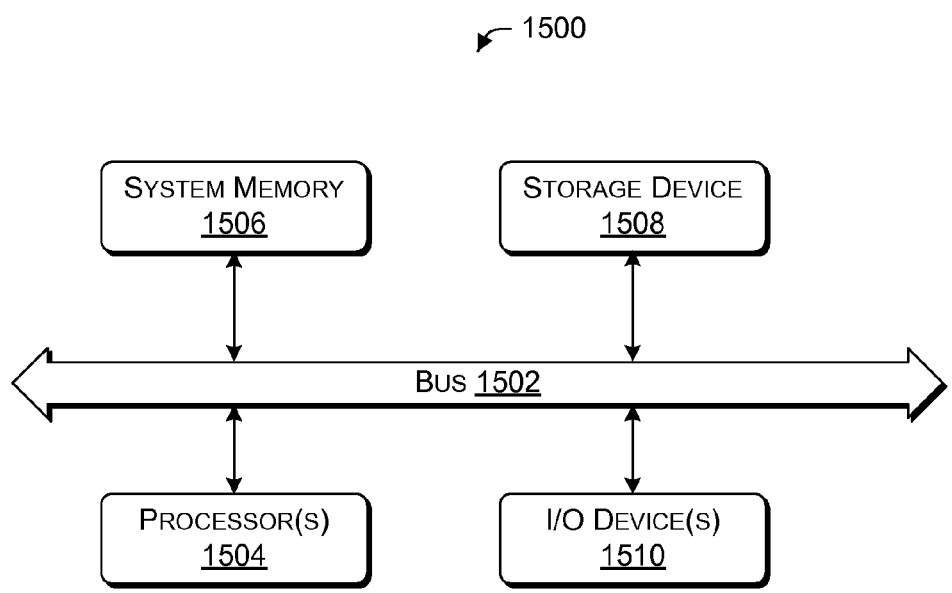
FIG. 15 illustrates an example of a general computing device that can be used to implement the non-mutating tree-structured file identifiers.

FIG. 15 illustrates an example of a general computing device 1500 that can be used to implement the non-mutating tree-structured file identifiers discussed herein. Computing device 1500 can be any one of the devices 102 or 104 of FIG. 1, and/or any one of the devices 202-208 of FIG. 2. Computing device 1500 is only one example of a computing device and is not intended to suggest any limitation as to the scope of use or functionality of the computing device and network architectures. Neither should computing device 1500 be interpreted as having any requirement regarding the inclusion (or exclusion) of any components or the coupling or combination of components illustrated in the example computing device 1500.

Computing device 1500 is a general-purpose computing device that can include, but is not limited to, one or more processors or processing units 1504, a system memory 1506, and a bus 1502 that couples various system components including the processor 1504 to the system memory 1506.

Bus 1502 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

System memory 1506 includes computer readable media in the form of volatile memory, such as random access memory (RAM), and/or non-volatile memory, such as read only memory (ROM) 1512.

Computing device 1500 may also include other removable/non-removable, volatile/non-volatile computer storage device 1508. By way of example, storage device 1508 may be one or more of a hard disk drive for reading from and writing to a non-removable, non-volatile magnetic media, a magnetic disk drive for reading from and writing to a removable, non-volatile magnetic disk (e.g., a "floppy disk"), an optical disk drive for reading from and/or writing to a removable, non-volatile optical disk such as a CD, DVD, or other optical media, a flash memory device, and so forth. These storage device(s) and their associated computer-readable media provide storage of computer readable instructions, data structures, program modules, and/or other data for computing device 1500.

User commands and other information can be entered into computing device 1500 via one or more input/output (I/O) devices 1510, such as a keyboard, a pointing device (e.g., a "mouse"), a microphone, a joystick, a game pad, a satellite dish, a serial port, a universal serial bus (USB), a IEEE 1394 bus, a scanner, a network interface or adapter, a modem, and so forth. Information and data can also be output by computing device 1500 via one or more I/O devices 1510, such as a monitor, a printer, a network interface or adapter, a modem, a speaker, and so forth.

An implementation of the non-mutating tree-structured file identifiers described herein may be described in the general context of computer-executable instructions, such as program modules, executed by one or more computing devices. Generally, program modules include routines, programs, objects, components, data structures, etc. that perform particular tasks or implement particular abstract data types. Typically, the functionality of the program modules may be combined or distributed as desired in various embodiments.

An implementation of the non-mutating tree-structured file identifiers may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD, digital versatile disks (DVD) or other optical storage, magnetic cassettes, magnetic tape, magnetic disk storage or other magnetic storage devices, or any other medium which can be used to store the desired information and which can be accessed by a computer "Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Conclusion

Although the description above uses language that is specific to structural features and/or methodological acts, it is to be understood that the appended claims are not limited to the specific features or acts described. Rather, the specific features and acts are disclosed as exemplary forms of implementing the non-mutating tree-structured file identifiers.

The invention claimed is:

1. One or more computer readable storage media having stored thereon a plurality of instructions that, when executed by one or more processors of a computing device, cause the one or more processors to perform a method comprising:

maintaining a plurality of electronic files across a plurality of networked computing devices, the plurality of networked computing devices forming an electronic file system, wherein each electronic file is stored on one of the plurality of networked computing devices, and wherein each of the electronic files is encrypted;

maintaining a plurality of non-mutating file identifiers, one non-mutating file identifier for each electronic file, across a plurality of tree structures, one or more tree structures residing on each of the plurality of networked computing devices, wherein each of the plurality of tree structures is located on a computer readable storage media distinct from any computer readable storage media storing one or more of the electronic files, wherein each non-mutating file identifier does not change over time over the lifespan of a corresponding electronic file, wherein each of the plurality of non-mutating file identifiers is unique across the electronic file system, and wherein each of the plurality of non-mutating file identifiers is formed by concatenating each of a plurality of encoded identifier components, wherein each of the plurality of encoded identifier components is encoded by:
converting an identifier component into a binary representation;
identifying a number of bits in the binary representation;
decrementing the number of bits by one to obtain an undated number of bits;
generating a string of 1's having a length equal to the updated number of bits;
appending a 0 to the end of the string of 1's; and
appending to the string of 1's, after the 0, all of the bits of the binary representation except for a leading 1 in the binary representation;

and identifying a file path name of an electronic file in the electronic file system using the corresponding non-mutating file identifier to identify a path in the electronic file system to a location on one of the plurality of networked computing devices where the corresponding electronic file is located by accessing successive nodes in the plurality of tree structures, wherein each node in each tree structure corresponds to a component of the corresponding non-mutating file identifier.

2. One or more computer readable storage media as recited in claim 1, wherein the electronic file system comprises a serverless distributed file system.

3. One or more computer readable storage media as recited in claim 1, wherein the method further comprises successively decoding each encoded component of the non-mutating file identifier and accessing successive nodes of the plurality of tree structures across the plurality of networked computing devices to identify the corresponding file path name in the electronic file system.

4. One or more computer readable storage media as recited in claim 1, wherein each of the plurality of non-mutating file identifiers is a string of integers and links between each adjacent pair of integers in the string of integers represent different components in a file path name for the corresponding one of the plurality of electronic files.

5. One or more computer readable storage media as recited in claim 4, wherein each of the plurality of tree structures comprises a plurality of multiple local roots.

6. One or more computer readable storage media as recited in claim 1, wherein each of the plurality of non-mutating file identifiers is a string of integers, and for each of the plurality of non-mutating file identifiers, a parent non-mutating file identifier in the tree structure for at least a portion of the non-mutating file identifier can be determined by removing a last integer from the portion.

7. One or more computer readable storage media as recited in claim 1, wherein for each of the plurality of non-mutating file identifiers, a value x represents an integer that is a component of the non-mutating file identifier, a value n represents how many components make up the non-mutating file identifier, and the non-mutating file identifier has a structure of: $x1, x2, x3 \ldots xn$.

8. One or more computer readable storage media as recited in claim 1, wherein the method further comprises resolving which of a plurality of directory servers a particular non-mutating file identifier is managed by.

9. A method comprising:

maintaining a plurality of electronic files across a plurality of networked computing devices, the plurality of networked computing devices forming an electronic file system, wherein each electronic file is stored on one of the plurality of networked computing devices, and wherein each of the electronic files is encrypted;

maintaining a plurality of non-mutating file identifiers, one non-mutating file identifier for each electronic file, across a plurality of tree structures, one or more tree structures residing on each of the plurality of networked computing devices, wherein each of the plurality of tree structures is located on a computer readable storage media distinct from any computer readable storage media storing one or more of the electronic files, wherein each non-mutating file identifier does not change over time over the lifespan of a corresponding electronic file, wherein each of the plurality of non-mutating file identifiers is unique across the electronic file system, and wherein each of the plurality of non-mutating file identifiers is formed by concatenating each of a plurality of encoded identifier components, wherein each of the plurality of encoded identifier components is encoded by:
    converting an identifier component into a binary representation;
    identifying a number of bits in the binary representation;
    decrementing the number of bits by one to obtain an updated number of bits;
    generating a string of 1's having a length equal to the updated number of bits;
    appending a 0 to the end of the string of 1's; and
    appending to the string of 1's, after the 0, all of the bits of the binary representation except for a leading 1 in the binary representation; and
identifying a file path name of an electronic file in the electronic file system using the corresponding non-mutating file identifier to identify a path in the electronic file system to a location on one of the plurality of networked computing devices where the corresponding electronic file is located by accessing successive nodes in the plurality of tree structures, wherein each node in each tree structure corresponds to a component of the corresponding non-mutating file identifier.

10. The method as recited in claim 9, wherein the electronic file system comprises a serverless distributed file system.

11. The method as recited in claim 9, wherein the method further comprises successively decoding each encoded component of the non-mutating file identifier and accessing successive nodes of the plurality of tree structures across the plurality of networked computing devices to identify the corresponding file path name in the electronic file system.

12. The method as recited in claim 9, wherein each of the plurality of non-mutating file identifiers is a string of integers and links between each adjacent pair of integers in the string of integers represent different components in a file path name for the corresponding one of the plurality of electronic files.

13. The method as recited in claim 12, wherein each of the plurality of tree structures comprises a plurality of multiple local roots.

14. The method as recited in claim 9, wherein each of the plurality of non-mutating file identifiers is a string of integers, and for each of the plurality of non-mutating file identifiers, a parent non-mutating file identifier in the tree structure for at least a portion of the non-mutating file identifier can be determined by removing a last integer from the portion.

15. The method as recited in claim 9, wherein for each of the plurality of non-mutating file identifiers, a value x represents an integer that is a component of the non-mutating file identifier, a value n represents how many components make up the non-mutating file identifier, and the non-mutating file identifier has a structure of: $x_1, x_2, x_3 \ldots x_n$.

16. The method as recited in claim 9, wherein the method further comprises resolving which of a plurality of directory servers a particular non-mutating file identifier is managed by.

* * * * *